US009508328B1

(12) United States Patent
Wakefield

(10) Patent No.: US 9,508,328 B1
(45) Date of Patent: Nov. 29, 2016

(54) DIGITAL SOUND EFFECT APPARATUS

(71) Applicant: Zachary Stephen Wakefield, Warrensburg, MO (US)

(72) Inventor: Zachary Stephen Wakefield, Warrensburg, MO (US)

( * ) Notice: Subject to any disclaimer, the term of this patent is extended or adjusted under 35 U.S.C. 154(b) by 0 days.

(21) Appl. No.: 14/879,977

(22) Filed: Oct. 9, 2015

(51) Int. Cl.
*G01P 3/00* (2006.01)
*G10H 1/02* (2006.01)
*G10H 1/055* (2006.01)
*G10H 1/34* (2006.01)

(52) U.S. Cl.
CPC .............. *G10H 1/0558* (2013.01); *G10H 1/34* (2013.01); *G10H 2210/155* (2013.01); *G10H 2220/361* (2013.01); *G10H 2220/395* (2013.01)

(58) Field of Classification Search
CPC ................. G10H 1/0558; G10H 1/34; G10H 2220/361; G10H 2220/395; G10H 2210/155
USPC ........................................................... 84/626
See application file for complete search history.

(56) References Cited

U.S. PATENT DOCUMENTS 3,767,833 A * 10/1973 Noble ...................... G10H 1/00 84/673
5,245,130 A * 9/1993 Wheaton ............. G10H 1/0066 84/377
6,005,181 A * 12/1999 Adams ................ G10H 1/0558 84/734
8,987,577 B2 * 3/2015 Eventoff ................. G10H 3/00 84/723
2007/0068372 A1 * 3/2007 Masuda ............... G10H 1/0008 84/723
2011/0025455 A1 * 2/2011 Whalen ................ G10H 1/0008 340/4.1

* cited by examiner

*Primary Examiner* — Jeffrey Donels
(74) *Attorney, Agent, or Firm* — Mashburn Law Offices, LLC; Donna Denise Mashburn

(57) ABSTRACT

A digital sound effect apparatus including a force sensing resistor, a processor, and a digital potentiometer. The digital sound effect apparatus may also include one or more inputs and/or interfaces, one or more power sources, and one or more power switches. The force sensing resistor outputs a voltage according to a user's variable force or other input. The processor generates a signal according to a function or look-up table with the voltage as an input. The digital potentiometer outputs a resistance or other electronic characteristic to generate a sound effect according to the user's variable force. The function or look-up table may be changed or modified via the one or more inputs and/or interfaces.

20 Claims, 2 Drawing Sheets

DIGITAL SOUND EFFECT APPARATUS

BACKGROUND

Figure 1:
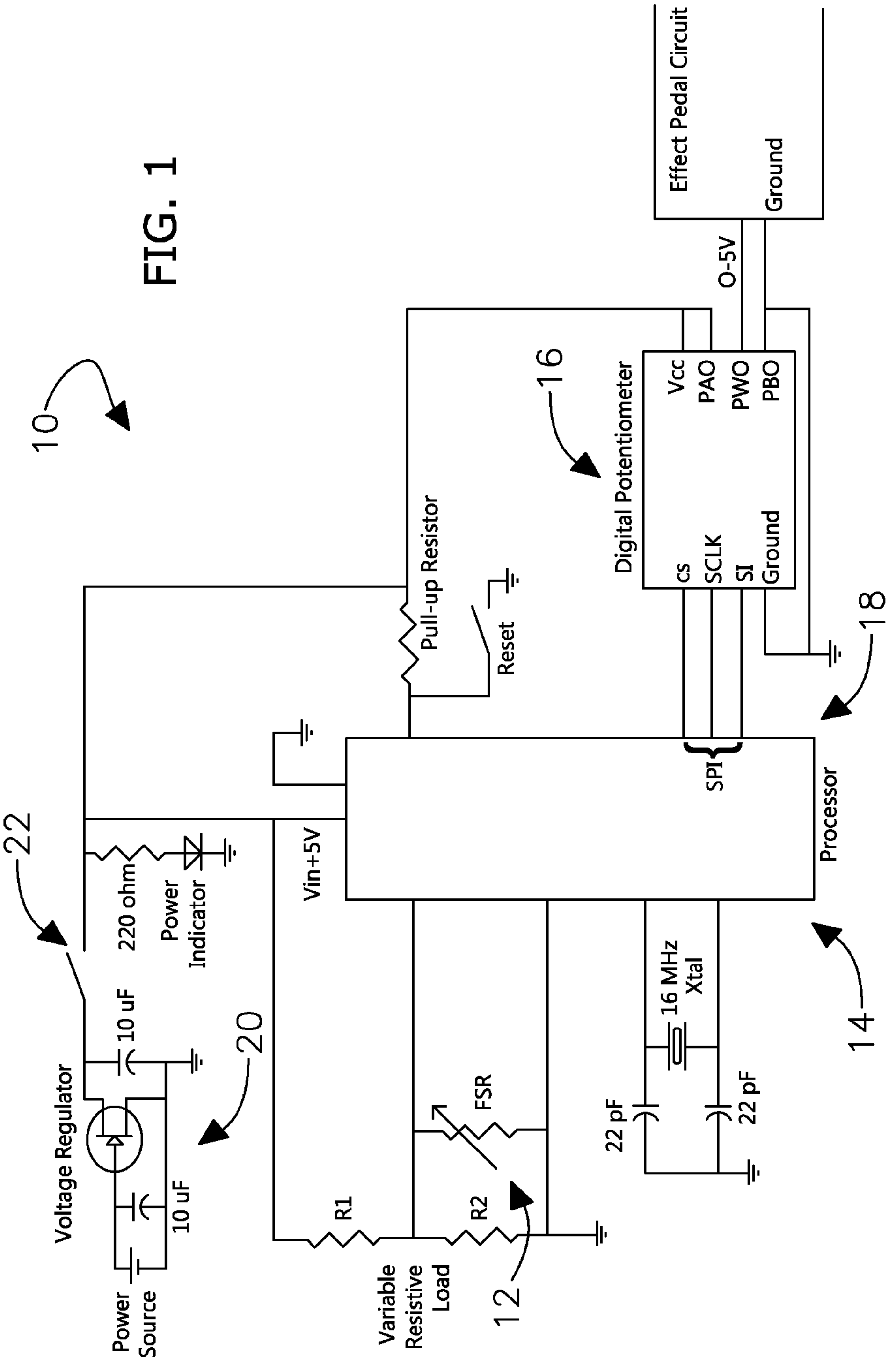

Embodiments of the present invention relate to sound effect apparatuses. Conventional sound effect apparatuses such as foot pedals and whammy bars require the user to stand in a certain spot, shift his balance onto one leg, or shift his hand or finger in order to manipulate them. For example foot pedals require the user to stand in one spot and step on them with varying pressure or angle to generate a desired sound effect. This can be difficult, especially while the user is trying to simultaneously play a musical instrument. Whammy bars and effects sliders and knobs require the user to shift his hand or move it entirely away from the musical instrument to generate the desired sound effect. This limits the user as to what he can play on his instrument while using the sound effect apparatus and can make certain combinations difficult. Conventional sound effect apparatuses are also limited to generating a predetermined effect or characteristic.

BRIEF SUMMARY

The present invention is a digital sound effect apparatus for use with a guitar, keyboard, or other similar musical instrument. The digital sound effect apparatus includes a force sensing resistor, a processor, and a digital potentiometer. The digital sound effect apparatus may also include one or more inputs, one or more power sources, and one or more power switches.

The force sensing resistor outputs a voltage according to a mechanical input such as force generated by a user's bite. The force sensing resistor may be a bite sensor or other similar sensor.

The processor receives the voltage from the force sensing resistor and generates a digital signal according to a predetermined function with the voltage as an input. The processor may be any computer, microchip, controller or other computing component.

The digital potentiometer outputs an analog resistance according to the digital signal received from the processor. The digital potentiometer may be integrated with the processor or may be a separate unit.

The inputs allow a user to change the predetermined function used by the processor, variables and parameters of the function, and other aspects of the digital sound effect apparatus as described below. The inputs may be buttons, discrete selector knobs, adjustor knobs, toggles, switches, or any other suitable input.

The above-described components may be communicatively connected to each other via cables or wires or wirelessly over via transceivers. The transceivers may communicate using Bluetooth or any other suitable communication protocol.

The power sources power the above components and may be replaceable batteries, battery packs, or wall plugs. The power sources may be integral with one or more of the components.

The one or more power switches allow the user to turn on and off one or more components of the digital sound effects apparatus. The one or more power switches may be integral with one or more of the components and may be wired so that the components may be turned on and off separately.

The function employed by the processor may be an algebraic equation such that the computer program or application stored on the processor or the computer circuitry of the processor generates a digital signal having a value or characteristic as an output of the function with the voltage received from the force sensing resistor being an input to the function. The output values of the function may relate to different amounts of a sound effect (e.g., "wah" or distortion) such that manipulating the digital sound effect apparatus creates the desired effect. Any of the parameters of the function (slope, direction, curvature, shift, and other parameters) may be changed or adjusted via the inputs. Manipulating one of the inputs may also switch between functions and/or effects.

Alternatively, the function may be a look-up table having a plurality of output values such that the processor uses the voltage received from the force sensing resistor as an input to the look-up table. The look-up table may be hard-coded into the sound effect apparatus or may be saved as a spreadsheet, data file, list, or similar soft code. Software may be used to change, remove, or add values or entries in the look-up table, overwrite the look-up table, store new and/or additional look-up tables, or replace the look-up table with a new one. The look-up table may also be referenced from a remote or external computer over a wireless communication network.

This summary is provided to introduce a selection of concepts in a simplified form that are further described in the detailed description below. The summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2A:
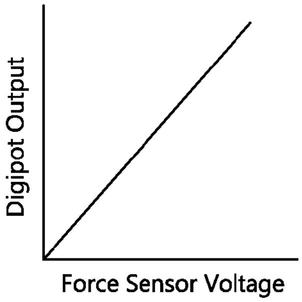
Figure 2B:
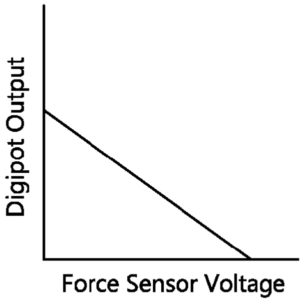
Figure 2C:
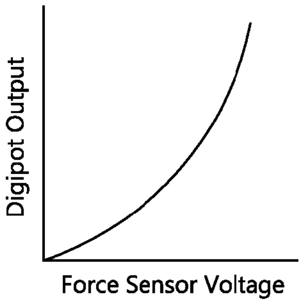
Figure 2D:
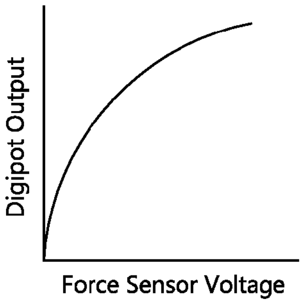
Figure 2E:
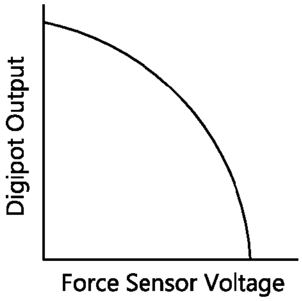
Figure 2F:
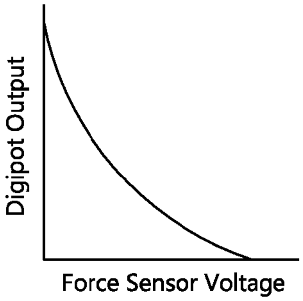
Figure 2G:
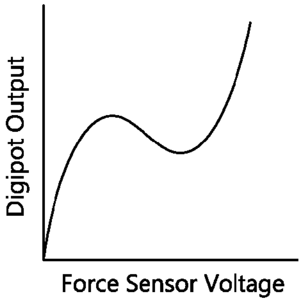
Figure 2H:
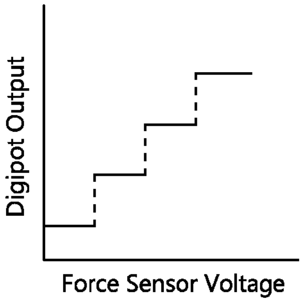

Embodiments of the present invention are described in detail below with reference to the attached drawing figures, wherein:

FIG. 1 is a digital sound effect apparatus constructed in accordance with an embodiment of the invention;

FIG. 2*a* is a positive effects function utilized by the digital sound effect apparatus in accordance with an embodiment of the invention;

FIG. 2*b* is a negative effects function utilized by the digital sound effect apparatus in accordance with an embodiment of the invention;

FIG. 2*c* is a positive effects function with an increasing slope utilized by the digital sound effect apparatus in accordance with an embodiment of the invention;

FIG. 2*d* is a positive effects function with a decreasing slope utilized by the digital sound effect apparatus in accordance with an embodiment of the invention;

FIG. 2*e* is a negative effects function with a decreasing slope utilized by the digital sound effect apparatus in accordance with an embodiment of the invention;

FIG. 2*f* is a negative effects function with an increasing slope utilized by the digital sound effect apparatus in accordance with an embodiment of the invention;

FIG. 2*g* is an effects function with increasing portions and decreasing portions utilized by the digital sound effect apparatus in accordance with an embodiment of the invention; and FIG. 2*h* is an effects function with discontinuities utilized by the digital sound effect apparatus in accordance with an embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, an embodiment of the present invention is a digital sound effect apparatus 10 broadly comprising a force sensing resistor 12, a processor 14, and a digital potentiometer 16. The digital sound effect apparatus 10 may also include one or more inputs 18, one or more power sources 20, and one or more power switches 22.

The force sensing resistor 12 outputs a voltage according to an input force or other mechanical-related input such as movement or position. The force sensing resistor 12 may be a bite force sensor or any other sensor or other similar sensor. The force sensing resistor 12 may have a biasing element configured to bias the force sensing resistor towards a first position. In this way, the force sensing resistor 12 may revert to outputting a particular voltage upon the lack of an input force. Alternatively, the force sensing resistor 12 may output a voltage dependent upon its last position.

The processor 14 receives the voltage from the force sensing resistor and generates a digital signal according to a predetermined function with the voltage as an input. The processor 14 may be any computer, microchip, controller or other computing component. For example, the processor 14 may be an ATmega 328 microprocessor, Raspberry Pi computer, or any other similar processor.

The processor 14 may include or may be configured to access one or more computer programs stored in or on computer-readable medium. The computer programs may comprise listings of executable instructions for implementing logical functions in the computers and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires or optical fibers, a portable computer diskette, a random access memory (RAM), a read-only memory (ROM), an erasable, programmable, read-only memory (EPROM or Flash memory), and a portable compact disk read-only memory (CDROM).

The digital potentiometer 16 outputs an analog resistance according to the digital signal received from the processor via a serial peripheral interface (SPI). The digital potentiometer 16 may be any digital potentiometer such as an MCP41100.

The one or more inputs 18 allow a user to change the predetermined function used by the processor 14, variables and parameters of the function, and other aspects of the digital sound effect apparatus as described below. The one or more inputs 18 may be buttons, discrete selector knobs, adjustor knobs, toggles, switches, the processor itself (as shown in FIG. 1), or any other suitable input and may be analog or digital. The inputs also may be virtual inputs such as those displayed on computer screens, smartphone screens, and the like.

The above-described components may be communicatively connected to each other via cables or wires or wirelessly over a wireless communication network via transceivers. The transceivers may communicate using Bluetooth or any other suitable communication protocol.

The one or more power source(s) 20 power the above components and may be replaceable batteries, battery packs, or wall plugs. The one or more power source(s) may be integral with one or more of the components.

The one or more power switches 22 allow the user to turn on and off one or more components of the digital sound effects apparatus. The one or more power switches 22 may be integral with one or more of the components and may be wired so that the components may be turned on and off separately.

The function employed by the processor 14 will now be described in more detail. The function may be an algebraic equation such that the computer program or application stored on the processor 14 or the computer circuitry of the processor 14 generates a digital signal having a value or characteristic as an output of the function with the voltage received from the force sensing resistor 12 being an input to the function. The output values of the function may relate to different amounts of a sound effect (e.g., "wah" or distortion) such that manipulating the digital sound effect apparatus 10 creates the desired effect. The value of the digital signal may be discrete divisions of the input voltage (e.g., one value for every 0.02 change of input voltage) but may be essentially indistinguishable from a continuous input and/or output. The function may exhibit an entirely positive (FIGS. 2*a*, 2*c*, and 2*d*) or entirely negative (FIGS. 2*b*, 2*e*, and 2*f*) input-to-output relationship, or a mixture of both (FIG. 2*g*). The function may have an increasing slope (2*c* and 2*f*) or a decreasing slope (2*d* and 2*e*) such that the sound effect changes a small amount for certain input ranges and a large amount for other input ranges. Changing between a positive and negative function provides the added benefit of allowing the user, in the case of a bite sensor, to bite down on the force sensing resistor 12, or alternatively to open or widen his mouth, to increase the desired effect. The function may also have non-continuous jumps or discontinuities (2*h*). Any of the parameters of the function (slope, direction, curvature, shift, and other parameters) may be changed or adjusted via the inputs 18. Manipulating one of the inputs 18 may also switch between functions and/or effects. The function/effect may also be superimposed or overlaid with another function to create complex effects. The processor 14 may be re-programmed or reconfigured with different functions and/or assignments of the inputs 18. The function may also be referenced from a remote or external computer over a wireless communication network. As such, the user may have complete control of the resultant sound effects.

Alternatively, the function may be a look-up table having a plurality of output values such that the processor 14 uses the voltage received from the force sensing resistor 12 as an input to the look-up table. The look-up table may be hard-coded into the sound effect apparatus 10 or may be saved as a spreadsheet, data file, list, or similar soft code. Software may be used to change, remove, or add values or entries in the look-up table, overwrite the look-up table, store new and/or additional look-up tables, or replace the look-up table with a new one. The look-up table may also be referenced from a remote or external computer over a wireless communication network.

The present invention provides many advantages over the prior art. For example, the force sensing resistor 12, in the case of a bite sensor, allows the user to generate guitar or other music effects without stepping on a foot pedal or manipulating additional devices with his hand. This frees the user to move around and play his instrument unrestricted and without diverting arm or leg coordination to generate the effect. The processor 14 and program or code also allows the user to fully customize the sound effect apparatus 10 and sound effects without changing devices or setup.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A digital sound effect apparatus comprising:
- a force sensing resistor configured to output a voltage according to a mechanical state;
- a processor configured to receive the voltage from the force sensing resistor and generate a signal based on the voltage according to a predetermined function; and
- a digital potentiometer configured to output a resistance according to the signal such that a user may alter the mechanical state of the force sensing resistor to generate a digital sound effect.

2. The digital sound effect apparatus of claim 1, wherein the force sensing resistor is configured to be mechanically acted upon by a user's jaw such that the user may bite down or relax his jaw muscle to alter the mechanical state of the force sensing resistor.

3. The digital sound effect apparatus of claim 2, wherein the digital sound effect apparatus effects a positive relation between an amount of force applied to the force sensing resistor and the digital sound effect.

4. The digital sound effect apparatus of claim 1, wherein the digital sound effect apparatus effects a negative relation between an amount of force applied to the force sensing resistor and the digital sound effect.

5. The digital sound effect apparatus of claim 1, wherein the digital sound effect apparatus may switch between effecting a positive relation between an amount of force applied to the force sensing resistor and the digital sound effect and effecting a negative relation between an amount of force applied to the force sensing resistor and the digital sound effect.

6. The digital sound effect apparatus of claim 1, further comprising an input for allowing a user to change a variable in the function.

7. The digital sound effect apparatus of claim 1, further comprising an input for allowing a user to switch between a plurality of functions.

8. The digital sound effect apparatus of claim 1, wherein at least one of the functions is a linear relation.

9. The digital sound effect apparatus of claim 1, wherein at least one of the functions is positive with an increasing slope.

10. The digital sound effect apparatus of claim 1, wherein at least one of the functions is negative with an increasing slope.

11. The digital sound effect apparatus of claim 1, wherein at least one of the functions is positive with a decreasing slope.

12. The digital sound effect apparatus of claim 1, wherein at least one of the functions is negative with a decreasing slope.

13. The digital sound effect apparatus of claim 1, wherein at least one of the functions has at least one non-continuous step.

14. The digital sound effect apparatus of claim 1, wherein the digital sound effect apparatus is communicatively connected to be used simultaneously with another sound effect apparatus such that the sound effect is a product of the digital sound effect apparatus and the other sound effect apparatus.

15. The digital sound effect apparatus of claim 1, wherein the digital sound effect apparatus is configured to generate a signal based on the voltage and another input according to the function such that the sound effect is a product of two inputs values received by the processor.

16. The digital sound effect apparatus of claim 1, wherein the digital sound effect apparatus further comprises a power source.

17. The digital sound effect apparatus of claim 1, wherein the digital sound effect apparatus further comprises a power switch.

18. The digital sound effect apparatus of claim 1, wherein the digital sound effect apparatus is configured to generate a digital signal such that an output value of the function relates to one of a plurality of sound effects.

19. A digital sound effect apparatus comprising:
- a bite force sensing resistor configured to output a voltage according to an amount of bite force exerted on the resistor;
- a processor configured to receive the voltage from the bite force sensing resistor and generate a signal based on the voltage according to a predetermined function;
- one or more inputs for changing the function; and
- a digital potentiometer configured to output a resistance according to the signal such that a user may bite on the bite force sensing resistor to generate a digital sound effect.

20. A digital sound effect apparatus comprising:
- a bite force sensing resistor configured to output a voltage according to an amount of bite force exerted on the resistor;

a processor configured to receive the voltage from the bite force sensing resistor and generate a signal based on the voltage according to values in a look-up table;

one or more inputs for changing values in the look-up table and/or changing to a different look-up table; and a digital potentiometer configured to output a resistance according to the signal such that a user may bite on the bite force sensing resistor to generate a digital sound effect.

* * * * *